United States Patent [19]
Marshall

[11] Patent Number: 4,744,706
[45] Date of Patent: May 17, 1988

[54] DEVICE FOR COLLET MOUNTING

[76] Inventor: Ernest H. Marshall, 30 Saulters Rd., Manchester, Conn. 06040

[21] Appl. No.: 15,685

[22] Filed: Feb. 17, 1987

[51] Int. Cl.⁴ .............................................. B23B 29/12
[52] U.S. Cl. .................................. 408/239 A; 409/232
[58] Field of Search ................. 408/238, 239, 239 A; 279/1 A, 1 TS, 8; 409/233, 232

[56] References Cited

U.S. PATENT DOCUMENTS

| | | | |
|---|---|---|---|
| 2,286,292 | 6/1942 | Mall | 279/1 |
| 2,449,284 | 9/1948 | Dorman | 279/1 |
| 2,478,195 | 8/1949 | Hull | 279/1 |
| 2,501,421 | 3/1950 | Stephan | 279/8 |
| 3,719,367 | 3/1973 | Baturka | 279/1 |
| 3,837,759 | 9/1974 | Bittern | 408/204 |
| 3,874,688 | 4/1975 | Schiller | 279/50 |
| 3,884,120 | 5/1975 | Diferdinando | 90/11 |
| 4,456,412 | 6/1984 | Ford et al. | 279/1 TS X |
| 4,604,010 | 8/1986 | Reeves | 409/233 |
| 4,655,631 | 4/1987 | Mitchell | 409/232 X |
| 4,678,382 | 7/1987 | Eckle | 408/239 R X |

*Primary Examiner*—Eugene F. Desmond
*Attorney, Agent, or Firm*—CTC & Associates

[57] ABSTRACT

A device for use in a lathe or similar rotary machine is constructed to receive the projecting nose portion of a collet, and to be pulled into firm contact with the face of the machine spindle so as to create an extremely rigid interconnection.

6 Claims, 1 Drawing Sheet

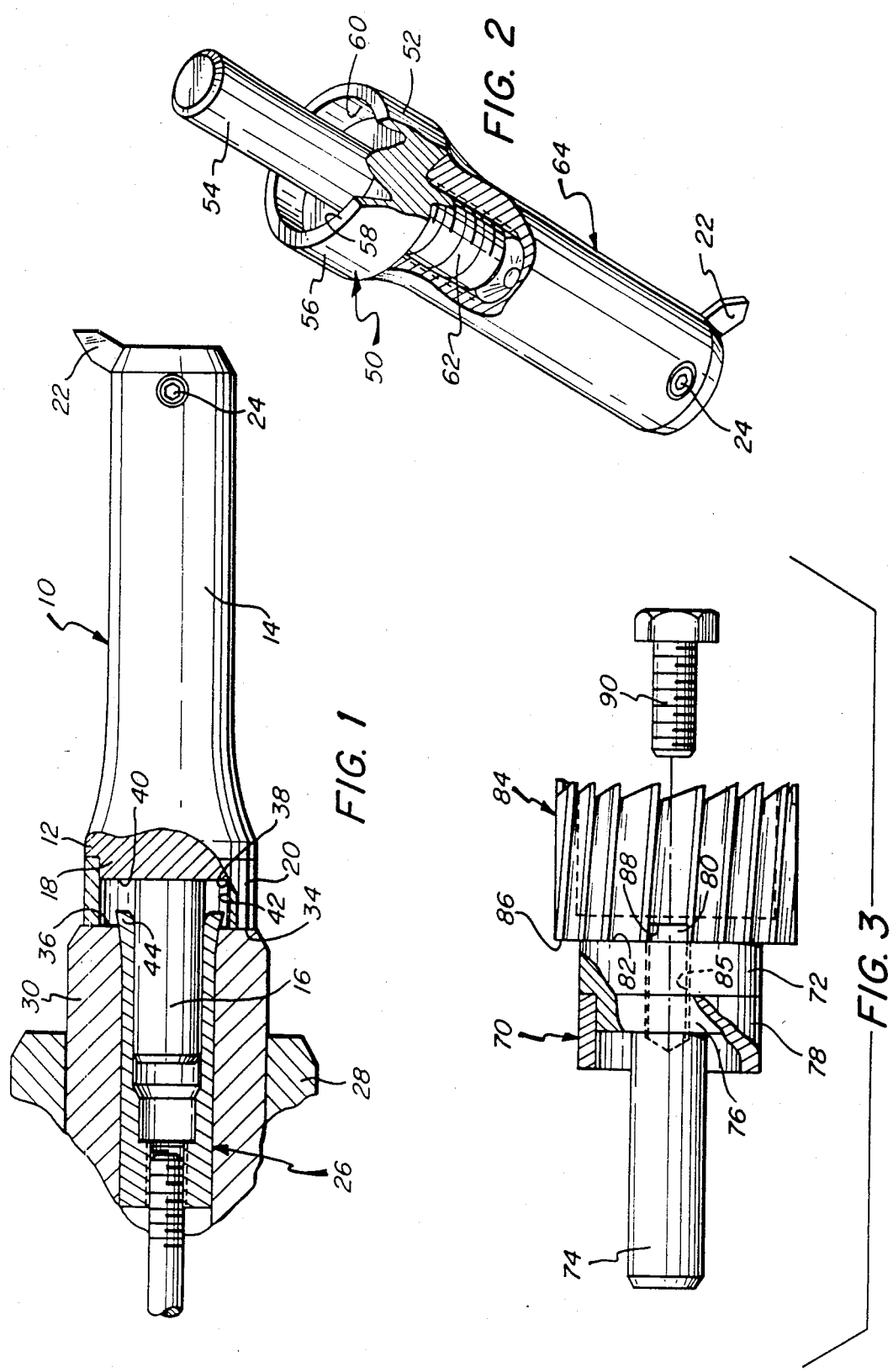

DEVICE FOR COLLET MOUNTING

BACKGROUND OF THE INVENTION

As is well known, precision machining operations utilizing a lathe, a mill or other such high-speed rotary machines, require that the means used for holding the cutting tool or the workpiece be highly rigid and stable to avoid chatter and vibration. Draw-in collets are widely utilized to hold tools and fixtures in such machines, and are not only effective in providing the necessary support but are also most advantageous in enabling quick release and set-up of the supported part. Normally, the shank of the tooling or fixture used is of relatively small diameter, resulting in a level of rigidity in the assembly that may be inadequate, in turn leading to the production of parts that exhibit less than the desired degree of dimensional accuracy and surface quality.

Various devices are shown in the prior art for use in connection with machines fitted with collet chucks. For example, Diferdinando U.S. Pat. No. 3,884.120 provides a unit in which the flange adjacent the larger end has a pair of opposed, rearwardly opening slots for receiving driving keys on the machine spindle. Other United States patents of some interest to such devices include the following: U.S. Pat. Nos. 2,286,292; 2,449,284; 2,478,195; 3,719,367; 3,837,759; 3,874,688; and 4,456,412. Despite the activity in the art indicated by the foregoing, a need remains for a device for mounting cutting elements, workpieces, and the like in the collet of a high-speed rotary machine, capable of affording secure and rigid interconnection and ensure against chatter or vibration of the mounted part.

Accordingly, it is the broad object of the present invention to provide a novel device for mounting in the collet of a high-speed rotary machine, which device carries the full rigidity of the machine spindle directly to the mounted part.

It is a more specific object to provide such a device in the form of either a tool, an adaptor or a fixture which is secured by the collet.

Another object of the invention is to provide such a device which is relatively simple and inexpensive to manufacture, and is yet highly effective for its intended purposes.

SUMMARY OF THE INVENTION

It has now been found that the foregoing and related objects of the invention are attained by the provision of a device which has a body, a shank extending from the body, and mounting means spaced from the shank. The body has a relatively deep groove formed into it and surrounding the base of the shank, to provide a recessed, generally annular end surface about the base and a circumferential lip extending in the direction of the shank. An end surface of the lip defines the rearmost contact area of the body as well as a cylindrical inside surface that is radially spaced from the shank. The construction of the device is such that it can be mounted in the machine collet with the forward portion of the collet contained within the surrounding groove formed into the body, and with the end surface of the lip positioned in engagement with the end surface of the spindle of the machine. The width and depth of the groove are sufficient to contain the portion of the collet that projects forwardly and lies outwardly of the end surface of the spindle, without substantial contact upon the cylindrical surface of the lip or the recessed end surface about the base of the shank.

In one embodiment, the mounting means of the device will comprise a threaded lug that extends coaxially with, and in the opposite direction from, the shank. In a second form, the mounting means will comprise a key element or elevated rib that is forwardly disposed on the body and that extends transversely of the axis of rotation.

Preferably, the shank of the device will be integrally formed with the body, as a single piece, and the lip will have an annular end surface and will be provided by a piece that is separately formed from the remainder of the body. In the latter instance, the piece that provides the lip will desirably be a short cylindrical collar, and the piece providing the remainder of the body may have a cylindrical projecting hub at the base of the shank, which extends coaxially therewith. The inside and outside diameters of the collar and the hub will be substantially the same, to permit close-fitting interengagement, but the collar will be of substantially greater axial length. As a result, the outer surface of the hub will provide the recessed end surface on the body, and the portion of the collar that extends therebeyond will provide the circumferential lip component.

BRIEF DESCRIPTION OF THE DRAWING

FIG. 1 is a fragmentary elevational view, in partial section, showing a device embodying the invention secured within the collet of a rotary machine and directly mounting a cutting element;

FIG. 2 is a perspective view showing an embodiment of the invention in which the device is in the form of an adaptor for a tool, with portions broken away to show internal features; and FIG. 3 is an elevational view, with a portion broken away, showing another form of the device used for mounting a shell end mill.

DETAILED DESCRIPTION OF THE ILLUSTRATED EMBODIMENTS

Turning now in detail to FIG. 1 of the drawing, therein illustrated is a device embodying the present invention, in the form of a modified boring bar, generally designated by the numeral 10. The tool has a round base portion 12 which tapers in the forward direction to a cylindrical mounting portion 14, and a shank portion 16 extends coaxially rearwardly from it. A short cylindrical hub portion 18 is provided between the base portion 12 and the shank portion 16, and a pressure ring 20 is press-fit thereonto. The portions 12, 14, 16 and 18 of the tool are integrally formed from one piece of steel, and a cutting or boring element 22 is seated in an opening formed into the tip of the mounting portion 14 and is held in place by a set screw 24, in conventional fashion.

The boring bar 10 is secured within the collet, generally designated by the numeral 26, of a boring machine; only the quill 28 and spindle 30 of the machine are shown. As will be appreciated, rearward force upon a draw-bar which is seen at the extreme left end of FIG. 1 will pull the collet 26 into the spindle 30, producing a tight gripping force upon the shank portion 16. In the fully inward position, the annular face 34 of the pressure ring 20 is held tightly and in full surface contact against the corresponding flat face 36 of the spindle 30, effectively transferring the rigidity of the spindle 30 directly to the tool over the entire area of the face 34. Were it not for this construction, rigidity of the tool would of course be limited by that of the shank portion 16.

As will be appreciated from FIG. 1, the depth and width of the circumferential groove 38 (defined by the base of the shank portion 16, the annular face 40 of the hub portion 18, and the portion of the inner surface 42 of the pressure ring 20 extending rearwardly beyond the annular face 40) are sufficient to receive the projecting nose portion 44 of the collet 26, without substantial contact. This is of course important from the standpoint of affording maximum rigidity in the interconnection.

FIG. 2 of the drawing shows a second embodiment of the invention wherein the device, generally designated by the numeral 50, is in the form of an adaptor. Like the tool 10 of FIG. 1, the adaptor 50 has an enlarged base portion 52 and a shank portion 54 extending axially from it. In this instance however the base portion 52 includes an integrally formed cylindrical lip component 56, which extends coaxially with the shank portion 54 and in the same direction; the component 56 provides a contact face 58 of annular configuration and, in cooperation with the base of the shank portion 54, a surrounding, circumferential groove 60. A threaded lug portion 62 serves to mount the cooperating tool, generally designated by the numeral 64, which is again in the form of a boring bar having a cutting element 22 held within a slot in the tip of the tool by a set screw 24.

Although not shown, it will be appreciated that the adaptor 50 is utilized with a collet-fitted machine and functions in the same way as does the integrally formed modified boring bar 10 of the previous Figure. That is, the annular face 58 bears tightly and in full surface contact against the corresponding planar face of the spindle when the adaptor is drawn in by engagement of its shank portion 54 within the collet, and it affords comparable rigidity for the tool 64.

Turning finally to the embodiment of FIG. 3, the device is in the form of a holder, generally designated by the numeral 70, for a shell end mill. It has an enlarged round base portion 72, a shank portion 74, and a hub portion 76, all of integrally formed, one-piece construction, and a separate pressure ring 78 is press-fit upon the hub portion 76. The mounting portion of the holder 70 includes an elevated rib element 80, which extends diametrically (with respect to the axis of rotation) across its forward face 82.

The shell end mill head, generally designated by the numeral 84, is mounted upon the face 82 and has a slot 88 formed diametrically into its rearward surface 86. As can be seen, the rib 80 on the base portion 72 is engaged within the slot 88 of the mill head 84, to provide a key and keyway arrangement for securing the head against relative rotation. The two parts are affixed to one another by a bolt 90, which is inserted axially through an aperture in the mill head 84 and is threadably engaged within a tapped bore 85 extending axially into the base portion 72 of the holder 70.

It will be evident from the foregoing that the device of the invention may take any of a wide variety of forms. It may constitute the tool on which the cutting or working element is directly mounted, or ir may be an adaptor or universal holder of the kind illustrated in FIGS. 2 and 3; the device may alternatively serve as a lathe fixture for mounting the workpiece during turning operations.

Among the advantages of the device of the invention are not only the highly stable and rigid connection that it affords, but also the level of productivity that its rapid set-up and convenient change characteristics enable. The dimensions of the tool and its construction may of course vary, as appropriate for any particular application and as indicated by the foregoing description.

Thus, it can be seen that the present invention provides a novel device for mounting a part in the collet of a high-speed rotary machine, which device carries the full rigidity of the machine spindle directly to the mounted part. The device may be in the form of a tool, an adaptor, or a fixture which is secured by the collet, and it is relatively simple and inexpensive to manufacture, and yet highly effective for it intended purposes.

Having thus described the invention, what is claimed is:

1. A device for mounting in a machine having a spindle including an axial bore and an end surface perpendicular to the axial bore at one end thereof and a collet including a main portion within the bore and a forward portion projecting outwardly of the bore a predetermined distance beyond the end surface of the spindle, said device having a cylindrical shank portion including a base end and a free end for entry into said collet, an annular surface projecting radially outwardly from said base end of said shank portion, an internal surface surrounding and confronting said shank portion and projecting longitudinally from the outer periphery of said annular surface, and a bearing surface perpendicular to the axis of said shank portion and projecting radially outwardly from the end of said internal surface remote from said annular surface for bearing engagement with the end surface of the spindle at a location radially outwardly of the forward end of the collet, with said shank portion, said annular surface and said internal surface providing a groove for free reception therein of the forward portion of the collet with said bearing surface engaging the end surface of the spindle.

2. The device of claim 1 wherein said annular surface is planar and perpendicular to the axis of said shank poriton, said internal surface is cylindrical and coaxial with said shank portion, and said bearing surface is circumferentially continuous and is of uniform radial width.

3. The device of claim 1 wherein said shank poriton, said annular surface, said internal surface and said bearing surface are integrally formed as a single piece.

4. The device of claim 1 wherein said shank portion and said annular surface are provided by a first piece and said internal surface and said bearing surface are provided by a second piece separately formed from said first piece.

5. The device of claim 4 wherein said first piece has a cylindrical hub coaxial with said shank portion and said second piece is a cyindrical collar, the diameter of said hub being substatantially the same as the inside diameter of said collar.

6. In combination, a machine having a spindle including an axial bore and an end surface perpendicualr to said axial bore at one end thereof and a collet including a main portion within said bore and a forward portion projecting outwardly of said bore a predetermined distance beyond said end surface of said spindle, and a device having a cylindrical shank portion within said collet and including a base end and a free end, an annular surface projecting radially outwardly from said base end of said shank portion, an internal surface surrounding and confronting said shank portion and projecting longitudinally from the outer periphery of said annular surface, and a bearing surface perpendicular to the axis of said shank portion and projecting radially outwardly from the end of said internal cylindrical surface remote from said annular surface and in bearing engagement with said end surface of said spindle at a location radially outwardly of said forward end of said collet, said shank portion, said annular surface and said internal surface providing a groove in which said forward end of said collet is located.

* * * * *